United States Patent [19]
Yamamoto et al.

[11] Patent Number: 5,096,662
[45] Date of Patent: Mar. 17, 1992

[54] METHOD FOR FORMING HIGH ABRASION RESISTING LAYERS ON PARENT MATERIALS

[75] Inventors: Yoshifumi Yamamoto, Hatsukaichi; Shigemi Ohsaki, Hiroshima; Katsuya Ohuchi, Hiroshima; Norio Yohshina, Hiroshima, all of Japan

[73] Assignee: Mazda Motor Corporation, Hiroshima, Japan

[21] Appl. No.: 510,076

[22] Filed: Apr. 17, 1990

[30] Foreign Application Priority Data

Apr. 17, 1989 [JP] Japan .................................. 1-097756
Apr. 17, 1989 [JP] Japan .................................. 1-097757

[51] Int. Cl.⁵ .............................................. B22F 7/00
[52] U.S. Cl. ................................. 419/9; 419/8; 419/36; 419/37
[58] Field of Search .................... 419/8, 9, 36, 37

[56] References Cited

U.S. PATENT DOCUMENTS

| | | | |
|---|---|---|---|
| 4,216,015 | 8/1980 | Hickl et al. | 428/678 |
| 4,608,225 | 8/1986 | Sakuramoto et al. | 419/5 |
| 4,661,676 | 4/1987 | Morita et al. | 148/903 |
| 4,678,633 | 7/1987 | Osaki et al. | 419/8 |
| 4,681,733 | 7/1987 | Konishi et al. | 419/8 |
| 4,905,538 | 3/1990 | Watanabe et al. | 148/903 |

FOREIGN PATENT DOCUMENTS

| | | |
|---|---|---|
| 60-230986 | 11/1985 | Japan . |
| 63-262401 | 10/1988 | Japan . |
| 1-75684 | 3/1989 | Japan . |

*Primary Examiner*—Stephen J. Lechert, Jr.
*Attorney, Agent, or Firm*—Wenderoth, Lind & Ponack

[57] ABSTRACT

A method for forming high abrasion resistive layers on parent materials in which power of an alloy iron including carbide generating elements is prepared using the atomizing method, sheets are formed from a mixture of the powder and a binder, the sheet is adhered to a parent material, and the sheet and the surface of the parent material are remelted by TIG arc to form a high alloy layer on the parent material.

22 Claims, 2 Drawing Sheets

METHOD FOR FORMING HIGH ABRASION RESISTING LAYERS ON PARENT MATERIALS

BACKGROUND OF THE INVENTION

1. Field of the Invention

The present invention relates to a method for forming high abrasion resisting layers on parent materials such as cams for driving valves of combustion engines.

2. Related Art

Cams for driving valves of an engine which rotate slidably contacting with locker arms and/or tappets are required to have a high abrasion resistivity. It has been known to harden the surface of the cam by remelting it using a heat source of a high energy density in order to enhance the abrasion resistivity.

When the surface of the cam of cast iron is remelted by the heat source having a high energy density, the portion remelted is rapidly cooled by the thermal conduction to the inner side of the cam to form a chilled layer having a high hardness and a fine structure and it becomes possible to obtain a hard layer of a high-alloy cast iron having a composition different from that of the parent material by supplying carbide forming elements such as Cr, Mo or the like upon remelting.

Conventionally, in the Japanese laid-open publication No. 60-230986, there is disclosed a method, as the surface hardening treatment for metal members such as cams, in which a sheet layer of an alloy power is formed on a surface of a parent metal member, for instance by adhering a sheet formed from a mixture of an alloy powder and an acrylic resin on the surface of the parent metal member, and after subjecting the sheet to a dewaxing treatment, the sheet layer of the alloy powder and the surface of the parent metal member are simultaneously remelted by a heating means having a high energy density to form a layer of a high alloy cast iron (See, for example, U.S. Pat. Nos. 4,608,225, 4,678,633 and 4,681,733).

As the heating means for remelting the sheet layer of the alloy powder, laser beam, electron beam, TIG arc (Tungsten Inert Gas arc) and the like are considered to be applicable. Among them, the TIG arc is very cheap when compared with others and, therefore, it is highly in demand to use the TIG arc for the remelting treatment.

However, there are some problems to be solved in the remelting method using the TIG arc.

Namely, in the alloy powder sheet to be remelted, grains or particles of a high melting point and grains or particles of a low melting point are coexisting in an inhomogeneous mixed state and grains or particles of a high melting point are apt to scatter upon remelting. As shown in FIG. 8 schematically, TIG arc torch 10 is positioned very near the alloy powder sheet 11 and, when the electrode 12 of the torch 11 is set within about 5 mm from the surface of the sheet 12, the electrode 12 is damaged severely by adhering scattered grains thereto.

SUMMARY OF THE INVENTION

Accordingly, an essential object of the present invention is to provide a method for forming a high abrasion resistive layer on a parent material using the TIG arc which is capable of preventing the TIG electrode from being damaged.

In order to achieve the object of the present invention, according to the present invention, there is provided a method for forming high abrasion resistive layers on parent materials comprising step for making powder of an iron alloy including carbide generating elements with use of the atomizing method, step for forming sheets of a thickness of 0.6 to 1.0 mm from a mixture of the powder and a binder, step for adhering each sheet on a surface of a parent material, step for dewaxing the sheet and step for remelting the sheet and the surface of the parent material by TIG arc to form a high alloy layer on the parent material.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENT

Figure 1:
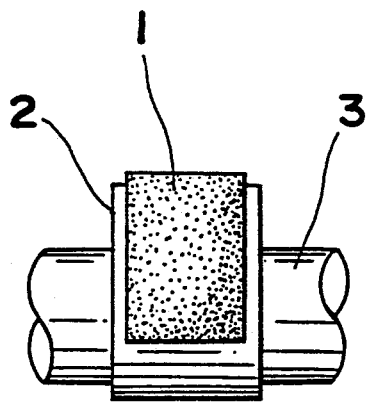
FIG. 1 is a front view of a cam for driving a valve of an engine on which an alloy powder sheet prepared according to the present invention.
Figure 2:
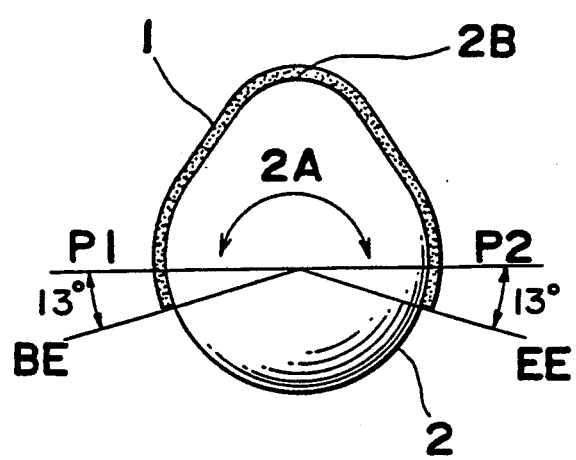
FIG. 2 is a side elevational view of the cam shown in FIG. 1.

As shown in FIG. 1 and FIG. 2, a green sheet 1 made of an alloy powder is adhered to predetermined range on the periphery of a cam 2 for driving an inlet or outlet valve of a combustion engine which is supported by a cam shaft 3. The cam is preferably made of a cast iron having a composition of C: 3.5 weight %, Si: 2.7 weight %, Mn: 0.4 weight %, P: 0.1 weight %, Si: 0.01 weight %, Mg: 0.4 weight % and Fe: the rest.

Figure 7:
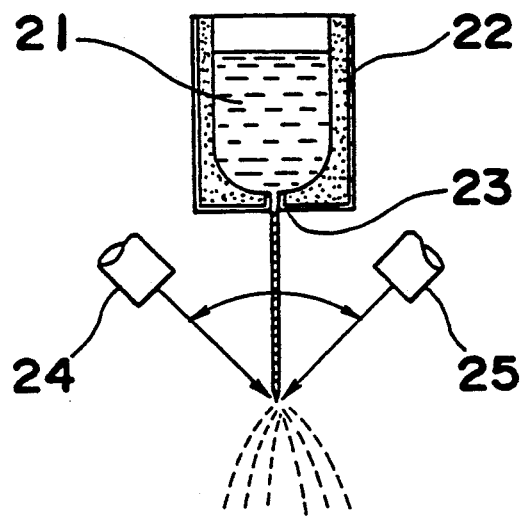
FIG. 7 is an explanatory view for showing the atomizing method for making alloy powder.

The alloy powder for forming the green sheet 1 is made by an indirect atomizing method as shown schematically in FIG. 7.

In the atomizing method, a molten metal 21 contained in a tundish 22 drops from a nozzle 23 and water or a gas such as $N_2$ or air is sprayed from spraying nozzles at a predetermined angle to a flow of the molten metal so as to form an alloy powder. The molten metal and, therefore, the alloy powder has a composition of Mo of 2.5 to 15 weight %, Cr less than 10 weight %, P of 0.5 to 3.0 weight %, C of 1.5 to 5.0 weight % and the remainder Fe.

According to the atomizing method mentioned above, segregation of the composition is suppressed and an amorphous alloy powder having a unified melting point can be obtained. As the result of an analysis of the alloy powder, it was confirmed that $Mo_2C$, $Cr_3C_2$ and $Fe_3P$ were precipitated on surfaces of amorphous Mo, Cr, C, P and Fe in a micro-crystallized state to form a homogeneous powder. The term "homogeneous powder" means that the rate of amorphous component is equal to or more than 80%.

Next, individual elements forming the alloy powder will be discussed.

Mo combines with Fe and C which contributes to strengthen the matrix of the alloy and to form hard phases and has a role for lowering the melting point thereof. If Mo is less than 2.5 weight %, the amount of the hard phase is decreased and it becomes difficult to alloy due to a decrease in the amount of the liquid phase. If Mo is more than 15 weight %, the amount of the liquid phase becomes excessive, resulting in a lowering of the toughness of the alloy. Accordingly, Mo is desirably contained in a range of from 2.5 to 15.0 weight %.

Cr contributes to enhance the abrasion resistivity and the hardenability by carbides formed thereby. If Cr is more than 10 weight %, it is saturated in the alloy and, accordingly, it is desirably less than 10 weight %. In order to effect the role of the enhancement of the abrasion resistivity and the hardenability, it should be contained equal to or more than 0.5 weight %. Accordingly, it is desirably contained in a range from of 0.5 to 10 weight %.

P combines with Fe and C and contributes to enhance the abrasion resistivity and to lower the melting point. If P is less than 0.5 weight %, the amount of the liquid phase becomes to small too contribute to the alloying. If it becomes more than 3.0 weight %, the liquid phase becomes too much to maintain a shape thereof.

Accordingly, P is desirably contained in a range from 0.5 to 3.0 weight %. C contributes to strengthen the matrix and to form the hard phase and also contributes to the alloying. If C is less than 1.5 weight %, it becomes difficult to maintain a shape because of an excess of the liquid phase. Thus, C is desirably contained in a range of from 1.5 to 5.0 weight %.

The alloy powder is graded using a sieve with a grade smaller than 300 mesh and desirably smaller than 200 mesh. The acrylic resin of 1.0 to 10.0 weight %, desirably 1.0 to 6.0 weight % is added to the alloy powder having been sieved.

Further, the mixture of the alloy powder and the acrylic resin is diluted by acetone and is kneaded. Thereafter, alloy powder sheets are formed from the mixture so as to have a thickness of 0.6 to 1.0 mm and a density of 3.0 to 5.0 g/cm$^3$, respectively.

Each alloy powder sheet 1 is adhered to the cam plane of the cam 2 with an acrylic bonding agent, as shown in FIGS. 1 and 2.

Then, the alloy powder sheet 1 is subjected to a dewaxing treatment by maintaining the cam 2 with the alloy powder sheet 1 at a temperature between 200° C. and 350° C. and desirably at about 300° C. in N$_2$ gas for a time between 0.5 hour and 1.5 hours and desirably about one hour.

Figure 3:
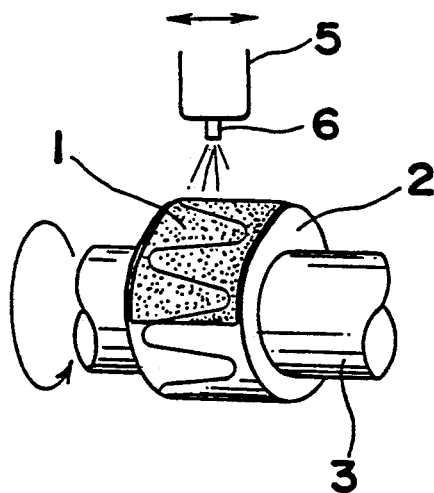
FIG. 3 is a perspective view for showing TIG remelting treatment according to the present invention.

After the dewaxing treatment, the cam 2 is set near a TIG torch 5 having a Tig electrode 6, as shown in FIG. 3. The alloy powder sheet 1 and the surface of the cam 2 are remelted by oscillating or reciprocating the TIG torch 5 at a predetermined speed while rotating the cam shaft 3 of the cam 2 at a predetermined speed.

The reasons why the thickness and the density of the alloy powder sheet 1 are chosen are as follows. Namely, if the thickness is less than 0.6 mm, the scattering amount of particles in the sheet increases upon the remelting treatment and the shortage of the alloy is invited in the case of the composition mentioned above resulting in a low hardness, smaller than 600 Hv with respect to the alloy powder sheet 1 having been subjected to the remelting treatment. If the thickness of the sheet 1 exceeds 1.0 mm, many blow holes are generated in a remelted pond. Accordingly, the thickness of the sheet is desirably chosen within a range of from 0.6 to 1.0 mm.

If the density of the alloy powder sheet is less than 3.0 g/cm$^3$, a lot of particles are scattered upon remelting the sheet and, if it exceeds 5.0 g/cm$^3$, the adhesiveness of the sheet is worsened by cracks and spalling of the sheet caused during the dewaxing treatment and thereby, scattering of particles and peeling off of the sheet are apt to occur.

Accordingly, the density of the alloy powder sheet is desirably chosen within a range of from 3.0 to 5.0 g/cm$^3$.

Since the alloy powder is made by the atomizing method, all particles in the alloy powder sheet are homogeneous and have a unified melting point having an intermediate value between the high melting point and the low melting point of particles of the conventional alloy powder sheet made using the grinding method. Accordingly, the sheet is melted homogeneously without particles not remelted which give damages to the electrode of the TIG torch and, therefore, the scattering of particles is suppressed greatly when compared with the case where particles of a high melting point and particles of a low melting point are coexisting.

Thus, according to the present invention, the alloy powder is melted into the parent material to form a high abrasion resistive surfacial phase of a high alloy cast iron.

FIRST EXAMPLE

An eutectic alloy powder having a composition of Mo of 9.0 weight %, Cr of 4.0 weight %, P of 2.0 weight %, C of 4.0 weight % and Fe the rest was prepared by the atomizing method as mentioned above. The eutetic alloy powder was sieved to have a grade smaller than 200 mesh, an acrylic resin of 6 weight % was added thereto and the mixture thus formed was diluted by acetone and was kneaded. Then, sheets having a thickness of 0.8 mm formed therefrom. The density of the sheet was 4.0 g/cm$^3$.

Thereafter, as shown in FIGS. 1 and 2, the alloy powder sheet 1 was adhered in a predetermined range on the surface of the cam 2 using an acrylic adhesive tape (not shown).

The range A on which the alloy powder sheet 1 is to be adhered is defined as being from a point BE located before the beginning and P1 of a cam lift portion 2A of the cam 2 by an central angle of 13°, via a cam nose section 2B, to a point EE locating after the ending end P2 of the cam lift portion 2A by an central angle of 13°, as shown in FIG. 2. The width of the alloy powder sheet is almost equal to that of the cam plane. The cam plane was finished so as to have a superficial roughness smaller than 4S after removing black skins formed after casting.

Then, the alloy powder sheet was subjected to the dewaxing treatment by maintaining the cam 2 in N$_2$ gas at a temperature of 300° C. for one hour.

After the dewaxing treatment, the TIG torch 5 was oscillated reciprocally in a direction of the width of the cam plane keeping the TIG electrode 6 of the TIG torch 5 near the sheet 1 at a predetermined small distance while rotating the cam plane to which the alloy powder sheet 1 was adhered, which powder sheet was remelted by an arc generated between the TIG electrode 6 and the cam plane.

Conditions of the TIG treatment were listed in Table 1.

TABLE 1

| TIG treating conditions | | |
|---|---|---|
| Electrode | Tungsten electrode of a diameter of 3.2 mm | |
| Distance between Electrode and Cam plane | 3.0 mm | |
| Beam current | 100 A | |
| Nos. of times of Rev. of Cam shaft | 0.6 rpm | |
| Oscillation conditions | Oscillation width | 11 mm |
| | Nos. of times of Oscillation | 30 times/min. |
| Shield gas | Ar | |
| | Pressure | 2.0 Kg/cm$^2$ |
| | Flow rate | 30 l/min. |

Since alloy particles hardly scattered during the TIG remelting treatment, the TIG electrode was not damaged even after the treatment of forty cams. The hardness of the high abrasion surfacing layer thus obtained was 800 Hv.

SECOND EXAMPLE

A sheet was adhered onto the surface of the cam which was made from an alloy powder formed by the water atomizing method. The composition of the alloy was Mo: 14 weight %, Cr: 10 weight %, P: 3.0 weight %, C: 5.0 weight % and Fe: the rest.

The alloy powder was prepared to have a grade smaller than 200 mesh. The thickness of the sheet was 1.0 mm and the density thereof was 4.0 g/cm$^3$.

After performing the dewaxing treatment wherein the cam was kept at 300° C. for one hour in N$_2$ gas, it was subjected to the TIG remelting treatment under conditions cited in Table 2. The surface of the cam became a layer of a high alloy cast iron having a thickness of 1.5 mm and the hardness thereof was Hv 950.

TABLE 2

| TIG treating conditions | | |
|---|---|---|
| Electrode | Tungsten electrode of a diameter of 3.2 mm | |
| Distance between Electrode and Cam plane | 4.0 mm | |
| Beam current | 150 A | |
| Nos. of times of Rev. of Cam shaft | 0.65 rpm | |
| Oscillation conditions | Oscillation width | 11 mm |
| | Nos. of times of Oscillation | 30 times/min. |
| Shield gas | Ar | |
| | Pressure | 2.0 Kg/cm$^2$ |
| | Flow rate | 30 l/min. |

THIRD EXAMPLE

A sheet was adhered onto the surface of the cam which was made from an alloy powder formed by the gas atomizing method. The composition of the alloy was Mo: 3.0 weight %, Cr: 1.0 weight %, P: 0.6 weight %, C: 1.6 weight % and Fe: the rest. The alloy powder was prepared to have a grade smaller than 100 mesh. The thickness of the sheet was 0.6 mm and, the density thereof was 4.0 g/cm$^3$. After performing the dewaxing treatment wherein the cam was kept at 350° C. for 30 minutes in H$_2$ gas, it was subjected to the TIG remelting treatment under conditions cited in Table 2. The surface of the cam became a layer of a high alloy cast iron having a thickness of 1.2 mm and the hardness thereof was Hv 720.

FOURTH EXAMPLE

A sheet was adhered onto the surface of the cam which was made from an alloy powder formed by the water atomizing method. The composition of the alloy was Mo: 8.0 weight %, Cr: 5.0 weight %, P: 1.5 weight % and Fe: the rest. The alloy powder was prepared to have a grade smaller than 200 mesh. The thickness of the sheet was 0.8 mm and the density thereof was 3.5 g/cm$^3$. After performing the dewaxing treatment wherein the cam was kept at 200° C. for one hour in N$_2$ gas, it was subjected to the TIG remelting treatment under conditions cited in Table 3. The surface of the cam became a layer of a high alloy cast iron having a thickness of 2.5 mm and the hardness thereof was Hv 770.

TABLE 3

| TIG treating conditions | | |
|---|---|---|
| Electrode | Tungsten electrode of a diameter of 3.2 mm | |
| Distance between Electrode and Cam plane | 4.5 mm | |
| Beam current | 200 A | |
| Nos. of times of Rev. of Cam shaft | 0.5 rpm | |
| Oscillation conditions | Oscillation width | 12 mm |
| | Nos. of times of Oscillation | 50 times/min. |
| Shield gas | Ar | |
| | Pressure | 1.0 Kg/cm$^2$ |
| | Flow rate | 10 l/min. |

COMPARISON EXAMPLE 1

An alloy powder was made from an ingot having the same composition as that of the first example using the grinding method wherein the grinding operation is repeated.

The alloy powder was a segregation powder comprised of α phases being solid solutions of Mo, Cr, P and C and carbides of Fe$_3$P, Mo$_2$C, Cr$_3$C$_2$ and Cr$_7$C$_3$. The powder was sieved to have a grade smaller than 200 mesh.

After adding an acrylic resin, dilution by acetone and kneading, alloy powder sheets having a thickness of 0.8 mm and a density of 4.0 g/cm$^3$ were formed. The alloy powder sheet was adhered to the cam plane and dewaxed. Then, the TIG remelting as cited in Table 1.

Figure 8:
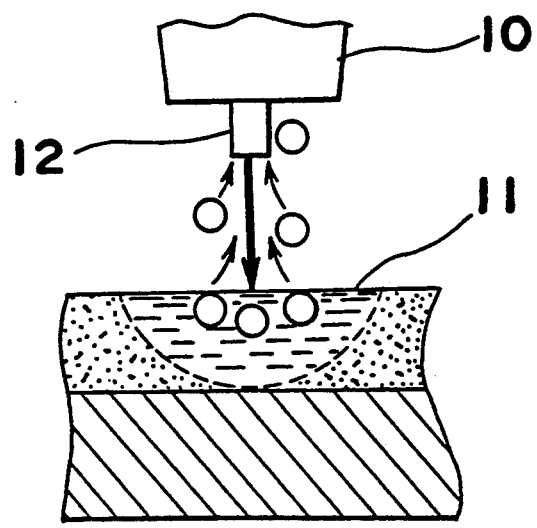
FIG. 8 is an explanatory view for showing a mechanism which damages the TIG electrode in the conventional TIG remelting process.

In this case, the TIG electrode was completely damaged when three cams were treated therewith. As stated above, in the allow powder sheet of the comparison example, particles of a high melting point were coexisting and the former particles scattered when the latter particles were remelted, as explained in FIG. 8. These particles scattered and severely damaged to the TIG electrode.

FIFTH EXAMPLE

Alloy powder sheets were prepared in the same manner as that of the first example and adhered to respective cam planes.

After dewaxing the sheet adhered to the cam plane, the TIG remelting treatment was done under TIG treatment conditions as recited in Table 4.

TABLE 4

| | |
|---|---|
| Diameter of Electrode | 3.2 mm |
| Beam current | 100 A |
| Melting speed | 0.5 m/min. |
| Nos. of Oscillation | 30 times/min. |
| Shield gas | Ar, Flow rate 20 l/min. |
| Distance between Electrode and Cam plane | 5.0 mm |
| Preheating temperature of Cam shaft | 300° C. |

Figure 4:
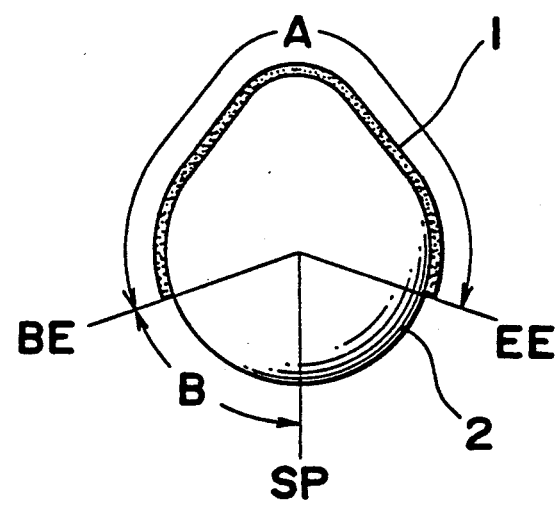
FIG. 4 is a side elevational view of the cam for showing ranges of the alloy powder sheet and the TIG remelting treatment.

In the second example, as shown in FIG. 4, the TIG torch 5 was started from a point SP locating before the beginning end BE of the sheet 1 by a central angle of 77°.

Due to this, the cam plane was heated up to a temperature of 400° to 500° C. at the beginning end BE of the sheet when the TIG torch 5 reached thereto.

In this case, cracks were never caused since the cooling speed to the molten formed was decreased reasonably.

COMPARISON EXAMPLE 2

In this example, the TIG torch was started at a point locating before the beginning end BE of the sheet by a central angle 30°. The sheet same as that of the second example was used and the TIG conditions were same as those recited in Table 4.

In this case, cracks were caused. This was considered to be caused due to insufficiency of the preheating of the cam plane.

COMPARISON EXAMPLE 3

In this example, the cam shaft was preheated up to 400° C. or more. The alloy powder sheet adhered to the cam plane was peeled off therefrom by an extraordinal oxidization of the sheet. Accordingly, it was impossible to subject the sheet to the remelting treatment.

Figure 5:
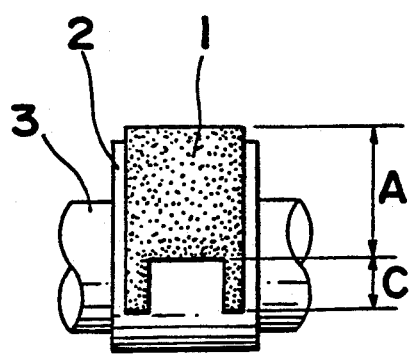
FIG. 5 and 6 are front views of the cam for showing variations of the second invention, respectively.
Figure 6:
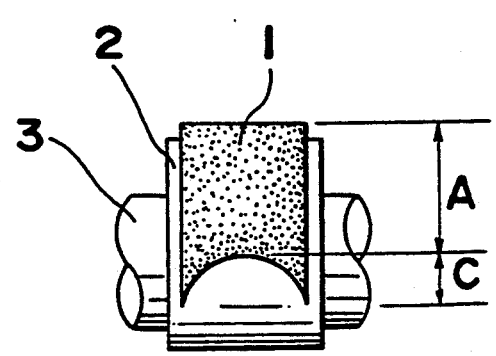

FIGS. 5 and 6 show variations of the second example, respectively.

In these variations, there are provided preheating zones C before zones A in which high abrasion resistive layers 1 are to be formed.

In the variation shown in FIG. 5, the alloy powder sheet 1 is formed elongated by a length equal to that of the preheating zone C and the elongated portion of the sheet 1 is partially cut off in such a manner that both side potions remain.

In the variation shown in FIG. 6, the elongated portion of the alloy powder sheet 1 is cut off in an arch shape.

In either of the variations, the TIG remelting by the TIG torch 5 is started from the beginning end SP of the preheating zone C.

Since the high alloying rate in the preheating zone C is low, cracks are prevented from generating therein. Further, the beginning end of the zone A is preheated reasonably by the TIG remelting in the preheating zone C and, therefore, cracks are also prevented from generating in the zone A.

Although the TIG remelting treatment is started from the beginning end of the preheating zone C in these variations, it can be started before the preheating zone C.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. Method for forming high abrasion resistive layers on parent materials comprising:
   a. forming a powder of an iron alloy including carbide generating elements by atomizing molten iron alloy containing said elements,
   b. forming sheets of a thickness of 0.6 to 0.1 mm from a mixture of the powder of a. and a binder,
   c. adhering each sheet of b. on a surface of a parent material,
   d. dewaxing the sheet and
   e. melting the sheet and the surface of the parent material by tungsten inert gas arc to form a high alloy layer on the parent material.

2. The method as claimed in claim 1 in which said iron alloy is comprised of Mo of 2.5 to 15.0 weight %, Cr smaller than 10 weight %, P of 0.5 to 3.0 weight %, C of 1.5 to 3.0 weight % and the remainder Fe.

3. The method as claimed in claim 2 in which the density of said sheet is 3.0 to 5.0 g/cm$^3$.

4. The method as claimed in claim 3 in which said binder is an acrylic resin.

5. The method as claimed in claim 4 in which the acrylic resin of 1.0 to 10.0 weight % is added to the powder of 100 weight %.

6. The method as claimed in claim 5 in which the parent material is a cam for driving a valve of a combustion engine.

7. The method as claimed in claim 1 in which the density of the sheet is of 3.0 to 5.0 g/cm$^3$.

8. The method as claimed in claim 1 in which said binder is an acrylic resin.

9. The method as claimed in claim 8 in which the acrylic resin of 1.0 to 10.0 weight % is added to said alloy powder.

10. The method as claimed in claim 1 in which said parent material is a cam for driving a valve of a combustion engine.

11. The method as claimed in claim 1 in which the melting of the surface of the parent material is started before a beginning end of said sheet adhered onto the article.

12. The method as claimed in claim 11 in which the melting of the surface of the parent material is started from a position whereat the surface of the parent material is covered with said sheet partially.

13. The method as claimed in claim 11 in which the melting of the surface of the parent material is completed at an ending end of said sheet.

14. The method as claimed in claim 13 in which said iron alloy is comprised of Mo of 2.5 to 15.0 weight %, Cr smaller than 10 weight %, P of 0.5 to 3.0 weight %, C of 1.5 to 5.0 weight % and the remainder Fe.

15. The method as claimed in claim 14 in which the density of said sheet is 3.0 to 5.0 g/cm$^3$.

16. The method as claimed in claim 15 in which said binder is an acrylic resin.

17. The method as claimed in claim 16 in which the acrylic resin of 1.0 to 10.0 weight % is added to the alloy powder.

18. The method as claimed in claim 17 in which said powder of the iron alloy is smaller than 200 mesh.

19. The method as claimed in claim 1 in which said powder of the iron alloy is smaller than 200 mesh.

20. The method as claimed in claim 1 in which the melting by tungsten inert gas arc is performed under an inert atmosphere.

21. The method as claimed in claim 20 in which the dewaxing treatment is performed in $N_2$ gas at a temperature of 200° to 350° C. and for a time of 0.5 to 1.5 hours.

22. The method as claimed in claim 1 in which the dewaxing treatment is performed in $N_2$ gas at a temperature of 200° to 350° C. and for a time of 0.5 to 1.5 hours.

* * * * *